United States Patent
Nádas et al.

(10) Patent No.: US 11,425,046 B2
(45) Date of Patent: Aug. 23, 2022

(54) PROBABILISTIC PACKET MARKING WITH FAST ADAPTATION MECHANISMS

(71) Applicant: Telefonaktiebolaget LM Ericsson (publ), Stockholm (SE)

(72) Inventors: Szilveszter Nádas, Budapest (HU); Gergö Gombos, Budapest (HU); Sandor Laki, Budapest (HU); Zoltán Turányi, Szentendre (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 93 days.

(21) Appl. No.: 16/960,616

(22) PCT Filed: Jan. 22, 2018

(86) PCT No.: PCT/EP2018/051418
§ 371 (c)(1),
(2) Date: Jul. 8, 2020

(87) PCT Pub. No.: WO2019/141380
PCT Pub. Date: Jul. 25, 2019

(65) Prior Publication Data
US 2020/0382427 A1 Dec. 3, 2020

(51) Int. Cl.
*H04L 47/215* (2022.01)
*H04L 47/2408* (2022.01)
(Continued)

(52) U.S. Cl.
CPC ........ *H04L 47/215* (2013.01); *H04L 47/2408* (2013.01); *H04L 47/2483* (2013.01); *H04L 47/31* (2013.01)

(58) Field of Classification Search
CPC ............... H04L 47/215; H04L 47/2408; H04L 47/2483; H04L 47/31
See application file for complete search history.

(56) References Cited

U.S. PATENT DOCUMENTS 5,881,049 A * 3/1999 Beshai ............... H04Q 11/0478
370/235
2001/0026546 A1* 10/2001 Schieder ............... H04W 76/25
370/349
(Continued)

FOREIGN PATENT DOCUMENTS

EP   1 528 725 A1   5/2005
WO  2014 189422 A1  11/2014

OTHER PUBLICATIONS

Rainbow Fair Queueing: Fair Bandwidth Sharing Without Per-Flow State Zhiruo Cao, Zheng Wang, Ellen Zegura 0-7803-5880-5/00/ $10.00 (c) 2000 IEEE (Year: 2000).*
(Continued)

*Primary Examiner* — Chi H Pham
*Assistant Examiner* — Weibin Huang
(74) *Attorney, Agent, or Firm* — Baker Botts, LLP

(57) ABSTRACT

At an Edge Node, a method of handling data packets in order to mark the packets with respective packet values indicative of a level of importance. The method comprises implementing a variable rate token bucket to determine an estimated arrival rate of a flow of packets. The method comprises receiving a data packet, updating the estimated arrival rate to an updated arrival rate based on a token level of the token bucket and generating a random or pseudo-random number within a range with a limit determined by the updated arrival rate. The method further comprises identifying an operator policy which determines a level of service associated with the flow of packets, and a Throughput Value Function (TVF) associated with said policy, and then applying the TVF to the random number to calculate a packet value. The packet value is included in a header of the packet.

26 Claims, 11 Drawing Sheets

(51) Int. Cl.
H04L 47/2483 (2022.01)
H04L 47/31 (2022.01)

(56) References Cited

U.S. PATENT DOCUMENTS

| | | | | |
|---|---|---|---|---|
| 2010/0008253 | A1* | 1/2010 | Mellachervu | H04L 45/54 370/254 |
| 2011/0093584 | A1* | 4/2011 | Qiu | H04L 61/1511 709/224 |
| 2015/0281106 | A1* | 10/2015 | Lee | H04L 45/38 370/236 |
| 2016/0105369 | A1* | 4/2016 | Nadas | H04L 47/2408 370/392 |

OTHER PUBLICATIONS

Per Packet Value: A Practical Concept for Network Resource Sharing by Szilveszter Nadas et al.—IEEE 2016.
Rainbow Fair Queueing: Fair Bandwidth Sharing Without Per-Flow State by Zhiruo Cao et al.; IEEE Infocom—2000.
PCT International Search Report for International application No. PCT/EP2018/051418—dated Oct. 8, 2018.
PCT Written Opinion of the International Searching Authority for International application No. PCT/EP2018/051418—dated Oct. 8, 2018.

* cited by examiner

PROBABILISTIC PACKET MARKING WITH FAST ADAPTATION MECHANISMS

PRIORITY

This nonprovisional application is a U.S. National Stage Filing under 35 U.S.C. § 371 of International Patent Application Serial No. PCT/EP2018/051418 filed Jan. 22, 2018 and entitled "Probabilistic Packet Marking with Fast Adaptation Mechanisms" which is hereby incorporated by reference in its entirety.

TECHNICAL FIELD

The invention relates to the field of probabilistic packet marking in packet switched networks.

BACKGROUND

In packet networks it is often important to be able to prioritise the routing of certain packets over other packets. For example, some packets may be associated with a subscriber paying for a premium service whilst others are associated with a subscriber paying for only a basic service level. Similarly, some packets may be associated with a service requiring limited but constant bandwidth and being sensitive to packet losses such as a voice call whilst other packets may be associated with a service that requires high or scalable throughput and can tolerate packet losses such as a file transmission service. One way to differentiate packets within a packet network is to "mark" each packet with a value to indicate the relative importance of the packet. Marking may be done at Edge Nodes of the packet network which are responsible for routing packets into the packet network.

The basic concept of a per packet marking based bandwidth sharing control method is to mark each packet with a value that expresses its importance. In a bottleneck node within the packet network these packet values (or importance values) are used in bandwidth sharing decisions. Packets of a given flow can have different importance values. In case of congestion, for example, packets with lower importance (smaller packet values) may be dropped first within the packet network.

WO2014/189422 and Nadas-2016 (S. Nadas, Z. R. Turanyi, and S. Racz. Per packet value: A practical concept for network resource sharing. In IEEE Globecom 2016, 2016) describe Per Packet Operator Value (PPOV) methods. Both methods are based on per packet marking based bandwidth sharing control, and allow bandwidth sharing control between flows even when per flow queuing is not possible. The algorithms are defined for a single buffer, which results in shared delay amongst the flows.

Packets may be marked by a marker node at the edge of a network (i.e. at an Edge Node). WO2014/189422 proposes a hierarchical token bucket (HTB) based packet marking method that works well in simulations, but which may have too high computational and storage complexity for practical applications. A large number of states have to be maintained, making the method inefficient in practice. The method requires O(N) states where N is the number of packet values to be differentiated.

Cao-2000 (Cao, Zhiruo, Zheng Wang, and Ellen Zegura. "Rainbow fair queueing: Fair bandwidth sharing without per-flow state." INFOCOM 2000. Nineteenth Annual Joint Conference of the IEEE Computer and Communications Societies. Proceedings. IEEE. Vol. 2. IEEE, 2000) describes a probabilistic packet marking method referred to as Rainbow Fair Queuing (RFQ). The method is used to assign "colours" from a finite set to the packets, based on arrival rate. To estimate the arrival rate at the marker nodes RFQ applies an exponentially weighted moving average (EWMA) scheme. For a given arrival rate, the colours assigned to the packets follow a predefined probability distribution. This approach may work well for stable traffic loads, but reacts slowly in transient situations when network conditions are changing, resulting in a high deviation from the expected packet colour distribution and a long stabilization period. This is a problem in real networks where significant fluctuations can be seen in the flows' arrival rates.

In simulations, as expected, the EWMA-based marking in RFQ proved to work well for stable traffic loads, but reacted slowly in transient cases, resulting in large fluctuations in the assigned packet values. This behaviour is far from what has been observed for the hierarchical token bucket (HTB) based marking method of WO2014/189422. HTB with high granularity can be considered an optimal marker, but as the granularity increases the storage and computational complexity also increases and may become too high for practical application.

SUMMARY

According to a first aspect of the present invention there is provided, at an Edge Node responsible for forwarding received packets onto a packet switched network, a method of handling the received data packets in order to mark the packets with respective packet values indicative of a level of importance to be used when further handling the packets within the packet switched network. The method comprises implementing a variable rate token bucket to determine an estimated arrival rate of a flow of packets, wherein the token bucket has a bucket threshold and a filling rate that can be changed. The method comprises receiving a data packet of said flow, updating the estimated arrival rate to an updated arrival rate based on a token level of the token bucket and generating a random or pseudo-random number within a range with a limit determined by the updated arrival rate. The method further comprises identifying an operator policy which determines a level of service associated with the flow of packets, and a Throughput Value Function (TVF) associated with said policy, and then applying the TVF to the random number to calculate a packet value indicative of the level of importance of the packet. The method then comprises including the packet value in a header of the packet and forwarding the packet onto the packet switched network.

The step of updating the estimated arrival rate may comprise determining if the estimated arrival rate is stable, overestimated or underestimated. The estimated arrival rate may be determined to be:

stable if the token level is between zero and a bucket threshold;
overestimated if the token level is greater than the bucket threshold;
underestimated if the token level is less than zero.

When the estimated arrival rate is underestimated, the updated arrival rate can be set to a rate that is greater than the estimated arrival rate, and the range within which the random number is generated is then set between the estimated and updated arrival rates. The updated arrival rate may be calculated by adding to the estimated arrival rate a value determined from the token level. Said value determined from the token level can be calculated by taking the absolute value of the token level, summing it with a byte constant, and dividing the sum by a time constant. The method may comprise setting the token level to a constant greater than zero after updating the arrival rate.

When the estimated arrival rate is overestimated, the updated arrival rate is set to a rate that is lower than the estimated arrival rate, and the range within which the random number is generated is then set between zero and the updated arrival rate. The updated arrival rate may be calculated by subtracting from the estimated arrival rate a value determined by the token level. Said value determined from the token level can be calculated by subtracting the bucket threshold from the token level, and dividing the difference by a time constant. If the updated arrival rate is less than the size of the packet divided by the time constant, the updated arrival rate may be set to equal the size of the packet divided by the time constant. If so, the method may comprise setting the token level to zero after updating the arrival rate.

When the estimated arrival rate is stable, the updated arrival rate can be set to a rate that is equal to the estimated arrival rate, and the range within which the random number is generated is then set between zero and the updated arrival rate.

The step of determining the token level may comprise calculating the token level from at least a previous token level, the estimated arrival rate, a size of the packet, and a time period between the arrival of said packet at the Edge Node and the arrival of an immediately preceding packet of said flow of packets at said Edge Node. For example, the token level may be given by the previous token level plus the size of the packet, minus the estimated arrival rate multiplied by said time period.

According to a second aspect of the present invention there is provided a method of managing packet traffic within a packet network. The method comprises, at Edge Nodes of the network, handling packets according to the first aspect, and receiving packets at intermediate nodes of the network, wherein the receiving nodes are configured to maximise the sum of packet values of packets being forwarded.

According to a third aspect of the present invention there is provided an Edge Node for use in a packet switched network in order to forward packets onto the network. The Edge Node is configured to mark the packets with respective packet values indicative of a level of importance to be used when further handling the packets within the packet switched network. The Edge Node comprises a receiver for receiving data packets and a processor or processors operative to, for each packet, implement a variable rate token bucket to determine an estimated arrival rate of a flow of packets comprising the data packet. The token bucket has a bucket threshold and a filling rate that can be changed. The processor or processors are further operative to update the estimated arrival rate to an updated arrival rate based on a token level of the token bucket, and to generate a random or pseudo-random number within a range with a limit determined by the updated arrival rate. The processor or processors are then operative to identify an operator policy which determines a level of service associated with the flow of packets, and a Throughput Value Function (TVF) associated with said policy, and to apply the TVF to the random number to calculate the packet value indicative of the importance of the packet. The processor or processors are further operative to include the packet value in a header of the packet. The Edge Node also comprises a sender for sending the marked packets onto the packet switched network.

The processor or processors may be operative to determine if the estimated arrival rate is stable, overestimated or underestimated. The processor or processors may be operative to determine that the estimated arrival rate is:
  stable if the token level is between zero and a bucket threshold;
  overestimated if the token level is greater than the bucket threshold; and
  underestimated if the token level is less than zero.

When the estimated arrival rate is underestimated, the processor or processors may be operative to set the updated arrival rate to a rate that is greater than the estimated arrival rate, and to then generate the random number within the range between the estimated and updated arrival rates. The processor or processors may be operative to calculate the updated arrival rate by adding to the estimated arrival rate a value determined from the token level. For example, the processor or processors may be operative to calculate said value determined from the token level by taking the absolute of the token level, summing it with a byte constant, and dividing the sum by a time constant. The processor or processors may be further operative to set the token level to a constant greater than zero after updating the arrival rate.

The processor or processors may be operative to calculate the token level from at least a previous token level, the estimated arrival rate, a size of the packet, and a time period between the arrival of said packet at the Edge Node and the arrival of an immediately preceding packet of said flow of packets at said Edge Node.

The Edge Node can be divided over multiple physical or virtual nodes of the packet switched network.

According to a fourth aspect of the present invention there is provided an Edge Node configured to perform the method of the first aspect.

According to a fifth aspect of the present invention there is provided a computer readable storage medium for storing computer executable instructions, which when executed cause the computer to perform the method of the first or second aspect.

DETAILED DESCRIPTION

Figure 1:
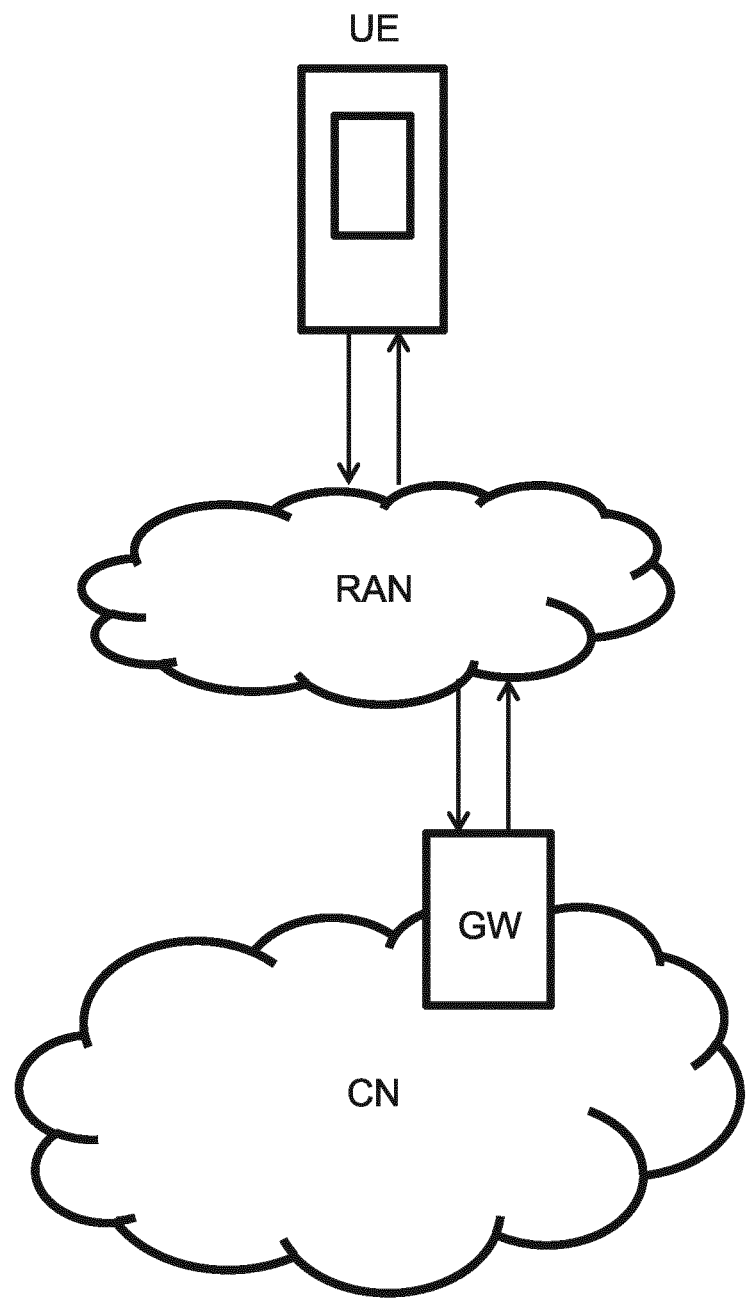
FIG. 1 is a schematic diagram of a radio communication network.

Embodiments described herein provide probabilistic packet marking methods that emulate the hierarchical token bucket (HTB) behaviour described in WO2014/189422. The methods only require three state variables, and the computational complexity is O(1) constant. Instead of maintaining and using several token buckets, the packet values are assigned by a probabilistic decision. To achieve this, the method estimates the arrival rate of flows to be marked, determines a random throughput value based on this measurement, and uses that throughput value to determine a Packet Value (PV).

A "token bucket" is a conceptual bucket that is filled with tokens (representing a number of bytes) at some fill rate. The token bucket has a maximum capacity of tokens referred to as the "bucket threshold". To send/forward a packet of a given size, a corresponding number of tokens adding up to the same size is removed from the bucket. If the rate and/or size of the packets in incoming flows is low, the bucket will overfill with tokens. Tokens spilling out of the top of the bucket are discarded. If, on the other hand, the rate of packets in the incoming flows is too high, then the bucket will empty of tokens. If there is an insufficient amount of tokens in the bucket to forward a packet, the packet may be dropped or otherwise handled to decrease the throughput of the corresponding flows.

The proposed methods have small implementation complexity compared to existing packet value marking algorithms, and enable use of a continuous packet value range. The methods are also better at emulating the HTB behaviour compared to RFQ.

Embodiments provide an acceleration method of probabilistic packet marking with faster adaptation to the changes in network conditions. The method may remedy the deviations in packet value distribution caused by errors in arrival rate estimation. Simulation results have shown that this method results in a packet value distribution (an empirical throughput-value function (TVF)) which better approximates the expected TVF of the operator policy to be applied. As a result of the proposed acceleration mechanisms, the bandwidth share at the bottleneck node satisfies the predefined operator policies with smaller deviations from the expected share around state transitions (e.g. at the presence of significant traffic bursts).

The method requires only three state variables and its computational complexity is constant, making it practical to implement. The method relies on measuring the arrival rate (R) of flows containing packets to be marked. Then the TVF V(.) is applied to a throughput value chosen uniformly at random from a throughput range defined by the rules of the method, resulting in a series of PVs matching the TVF (operator policy).

In general, packet marking should satisfy two key requirements: 1) for stable traffic the empirical TVF should follow the configured TVF (operator policy); 2) the method should react quickly to changes in the arrival rates.

To imitate the hierarchical token bucket (HTB) behaviour with a single variable rate token bucket, the random throughput value is chosen from a range between the old estimate and the new (updated) estimate when the estimate is increased. In addition, when increasing the rate estimate, a non-zero token bucket (i.e. token level>0) can be created to avoid having consistently small Packet Values when ramping up.

FIG. 1 illustrates schematically a communication network comprising a User Equipment (UE), a Radio Access Network (RAN), and a Core Network (CN). The Core Network has a Gateway (GW) node which represents an Edge Node of the RAN. Embodiments of the invention may be implemented at the Edge Node. Packets from the Core Network that are being routed towards the UE (the end node) can be marked with a packet value at the GW node. The GW node receives the packet from the core network, determines a packet value according to an embodiment of the described method, and sends the packet to a node in the RAN. In the case of a bottleneck, one or more nodes in the RAN may implement some congestion or traffic control procedure based on the packet values. In general, packets with a high value are more likely to reach the UE, whereas packets with a low value are more likely to get dropped by the RAN or be otherwise delayed.

Figure 2:
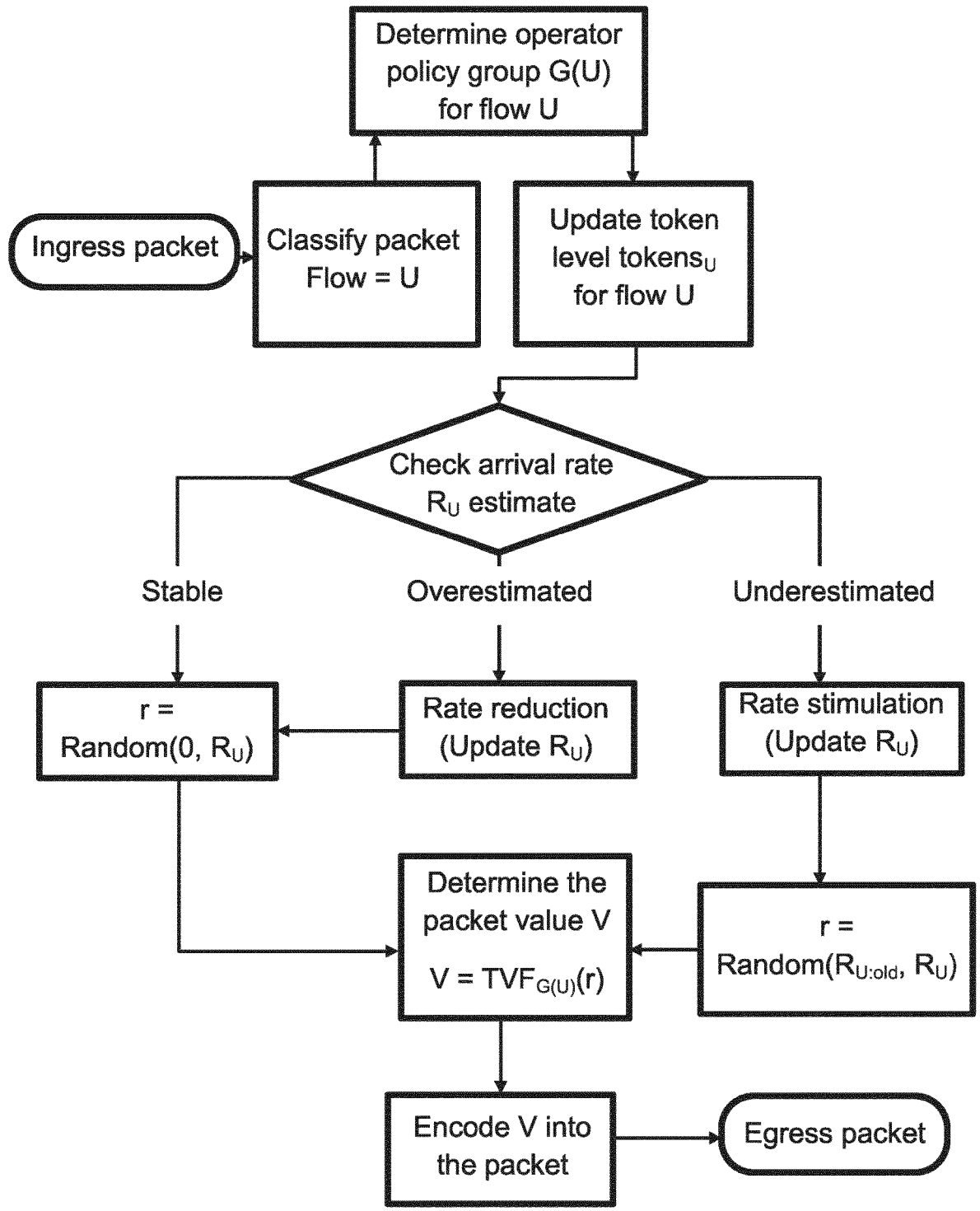
FIG. 2 is a flow diagram showing the steps of a method according to an embodiment.

A detailed description of the method is depicted in FIG. 2. The method can be split into the following steps:

1) Initialization: This step is executed once after startup and is responsible for setting up the initial values of variables used by the method. In the method, three variables are maintained; $R_U$ and tokens$_U$ for expressing the arrival rate and the current size of a token bucket (i.e. the token level), and $L_U$ for the bucket threshold (i.e. the maximum capacity of the bucket). Upon startup, both the initial rate and token level can be set to zero.

2) Classify packet: After arrival the packets should be classified since the operator policies define resource sharing rules at the user, connection or application level, meaning that it is necessary to decide which packet belongs to which user, connection or application. Note that these concepts can also be combined, for example different policies can be applied to VoIP and other traffic of the same user. According to the illustrative Figure, the flow U identifies the packets that belong together, resulting in a traffic flow regulated by a given operator policy.

3) Determine the operator policy group to be applied: After the traffic flow is identified, the operator policy to be applied is determined. According to the PPV concept, these policies are defined as throughput-value functions (TVFs). There is a unique mapping between flows and TVFs. According to the Figure, G(U) identifies the operator policy defined by $TVF_{G(U)}$ for flow U.

4) Update the arrival rate and determine a throughput value of the packet: The arrival rate is maintained for each flow (e.g. if the policy is defined for handling the traffic of users, each user should have its own flow; if different policies are applied to different applications, each flow represents all the packets generated by a single application; etc.). After a packet with flow U arrives, the arrival rate $R_U$ is updated as set out below.

First, the token bucket is updated so that both the actual arrival rate and the size of the incoming packet are taken into account:

$$\text{tokens}_U = \text{tokens}_U + R_U * \Delta t - p.\text{size}, \quad (1)$$

where tokens$_U$ is the current token level, $\Delta t$ is the time elapsed since the last packet was received from flow U and p.size is the size of the incoming packet. Based on the new token level, three different cases can be distinguished:

a) Stable period: If the new token level is between zero and the bucket threshold $L_U$, the current rate estimate $R_U$ is considered stable and therefore there is no need for further adjustment. In this case, the new token level is accepted and the packet throughput is calculated as r=random(0, $R_U$) (chosen uniformly at random).

b) Rate overestimation: If tokens$_U$ is above $L_U$, the rate estimate should be reduced. The new rate is calculated as $R_U = R_{U;old} - (\text{tokens}_U - L_U)/D_U$, where $D_U$ is an averaging constant (e.g. $D_U$=40 ms). If this new estimate is below p.size/$D_U$, the rate represented by this single packet in a $D_U$ interval, the traffic has a long idle period. In this case we reset the system as if a packet arrived to a freshly initialized buffer: $R_U$=p.size/$D_U$ and tokens$_U$=0. The packet throughput is then calculated as r=random(0, $R_U$) (chosen uniformly at random).

c) Rate underestimation: If tokens$_U$ is less than zero, the rate $R_U$ is considered underestimated and thus is updated as $R_U$=$R_{U;old}$+(|tokens$_U$|+$B_U$)/$D_U$. To compensate for rate underestimation we use throughput r=random($R_{U;old}$, $R_U$) (chosen uniformly at random). In this way we aim at emulating HTB behaviour when all the buckets below $R_{U;old}$ are depleted. To avoid increasing $R_U$ and choosing from this new interval too often, we accelerate the increase in the rate estimate with B (1500 byte). We also reset the token level to B after the rate increase, overwriting the negative tokens$_U$.

5) Determine the packet value: The packet value can then be calculated by applying the operator policy of flow U as the TVF function of policy group G(U): V=TVF$_{G(U)}$(r)

6) Encode the packet value into the packet: The calculated packet value V should be added to the packet before sending. It can be stored in an unused field of an existing protocol header (e.g. ToS), or a new header carrying this value can be added to the packet.

Although the above embodiment is described by steps 1 to 6 as performed in a particular order, the skilled person will appreciate that in other embodiments some of the steps may be performed in a different order. For example, steps 2 and 3 of classifying the packet and determining the operator policy may be performed after updating the arrival rate and determining the throughput value (step 4).

Figure 3:
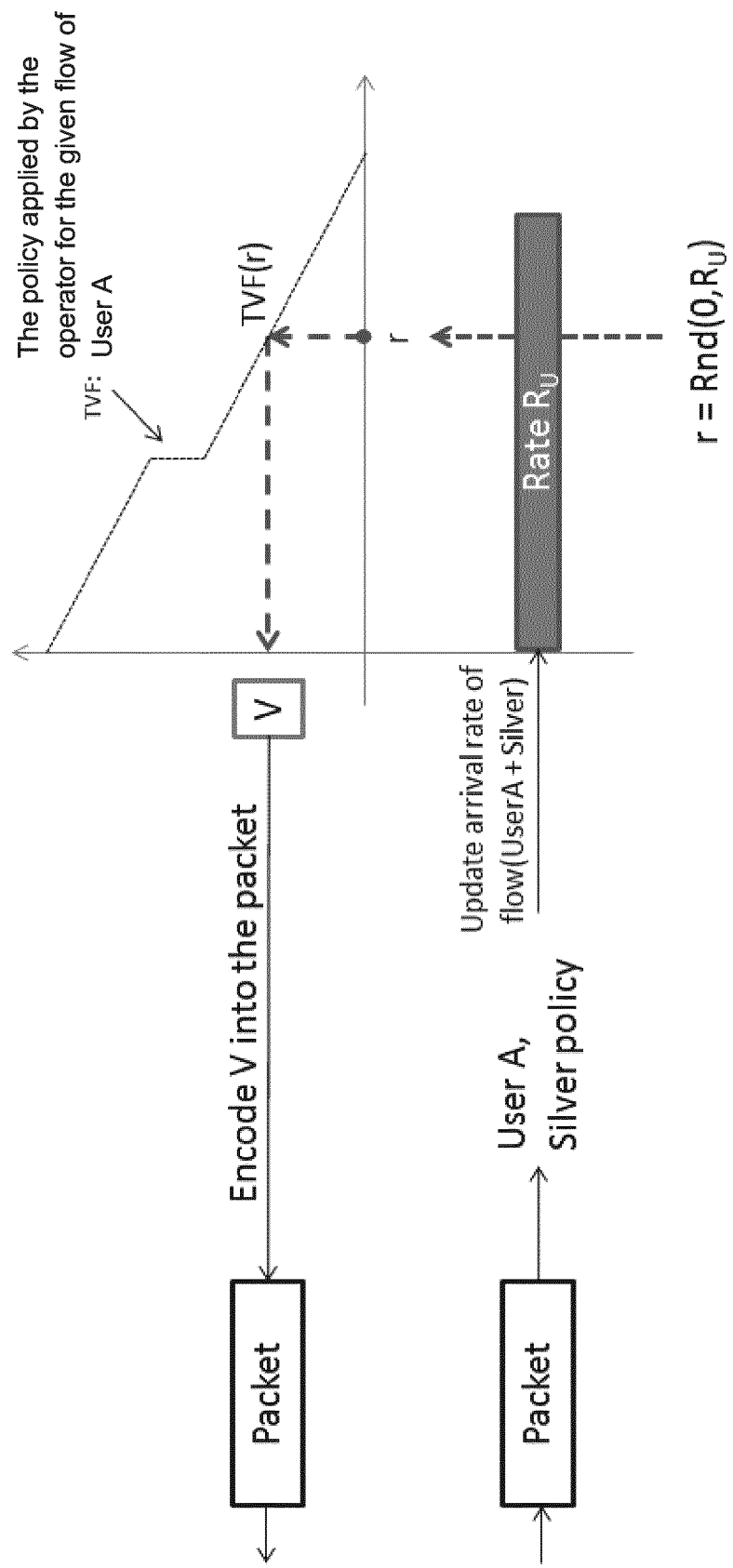
FIG. 3 is flow diagram showing the steps of a method according to an embodiment.

An example of the proposed method when the arrival rate is stable is illustrated in FIG. 3. An incoming packet arrives at the marker node (i.e. the Edge Node) which classifies it and determines which operator policy (and corresponding TVF) should be applied. In the example, the packet belongs to a "silver" application flow of UserA. The Edge Node updates the arrival rate estimate of UserA's silver flows and then generates a packet value by a random process. The random process involves selecting a random or pseudorandom number from a range between 0 and $R_U$, and then applying the policy, given as a TVF, to the random number. The resulting value is encoded in the outgoing packet (i.e. the packet value is included in a header of the packet).

Figure 4:
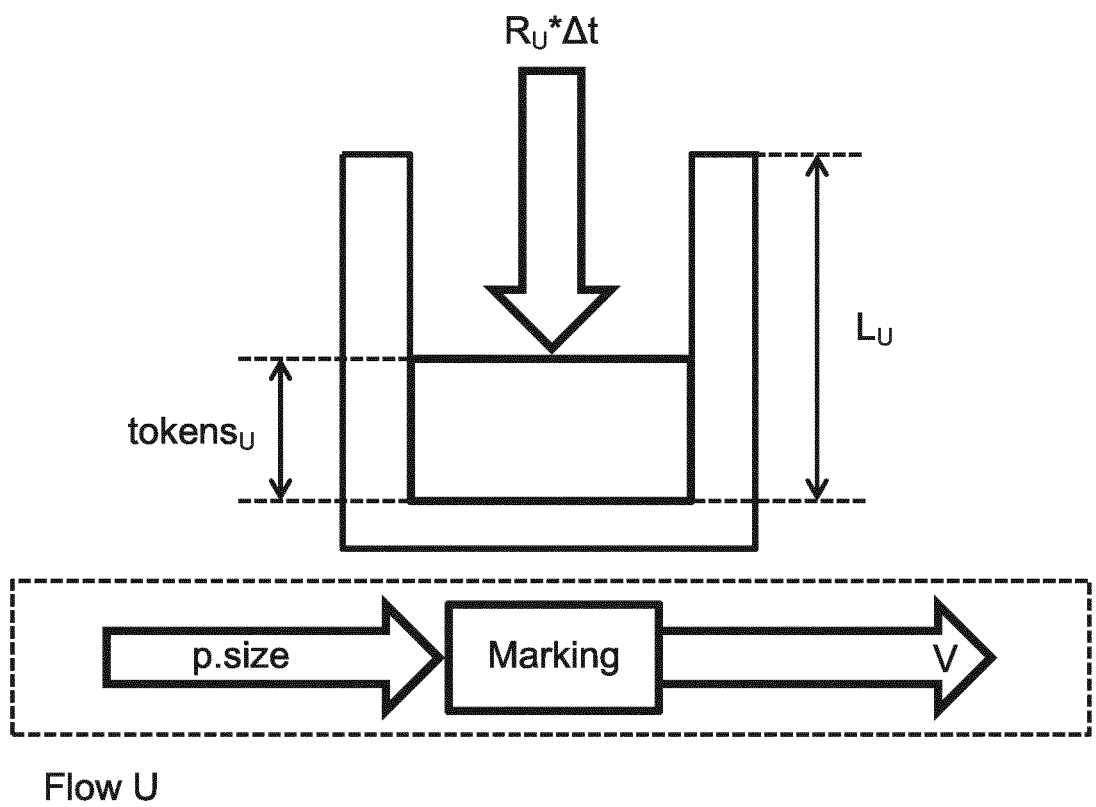
FIG. 4 is a schematic diagram of a token bucket according to an embodiment when the flow rate is stable.

FIG. 4 illustrates a token bucket according to an embodiment of the invention when the arrival rate ($R_U$) is stable. A packet of flow U with a packet size p.size arrives at the Edge Node (i.e. the marking node). The token level of the bucket is updated by adding $R_U$*$\Delta$t bytes worth of tokens to the bucket, and removing tokens up to a number of bytes equal to p.size. The token level is less than the bucket threshold ($L_U$) (i.e. the bucket is not overflowing) but greater than zero (above the bottom of the bucket). Hence, the arrival rate is determined to be stable. The updated arrival rate is set to equal the previous arrival rate (which was used to calculate the token level), i.e. the value of the estimated arrival rate remains unchanged. A random (or pseudo random) number is generated in the range of 0 to $R_U$, and input into the appropriate TVF (corresponding to the operator policy for flow U) to generate the packet value V. The packet value V is included in a header of the packet, which is then forwarded onto the packet network.

Figure 5:
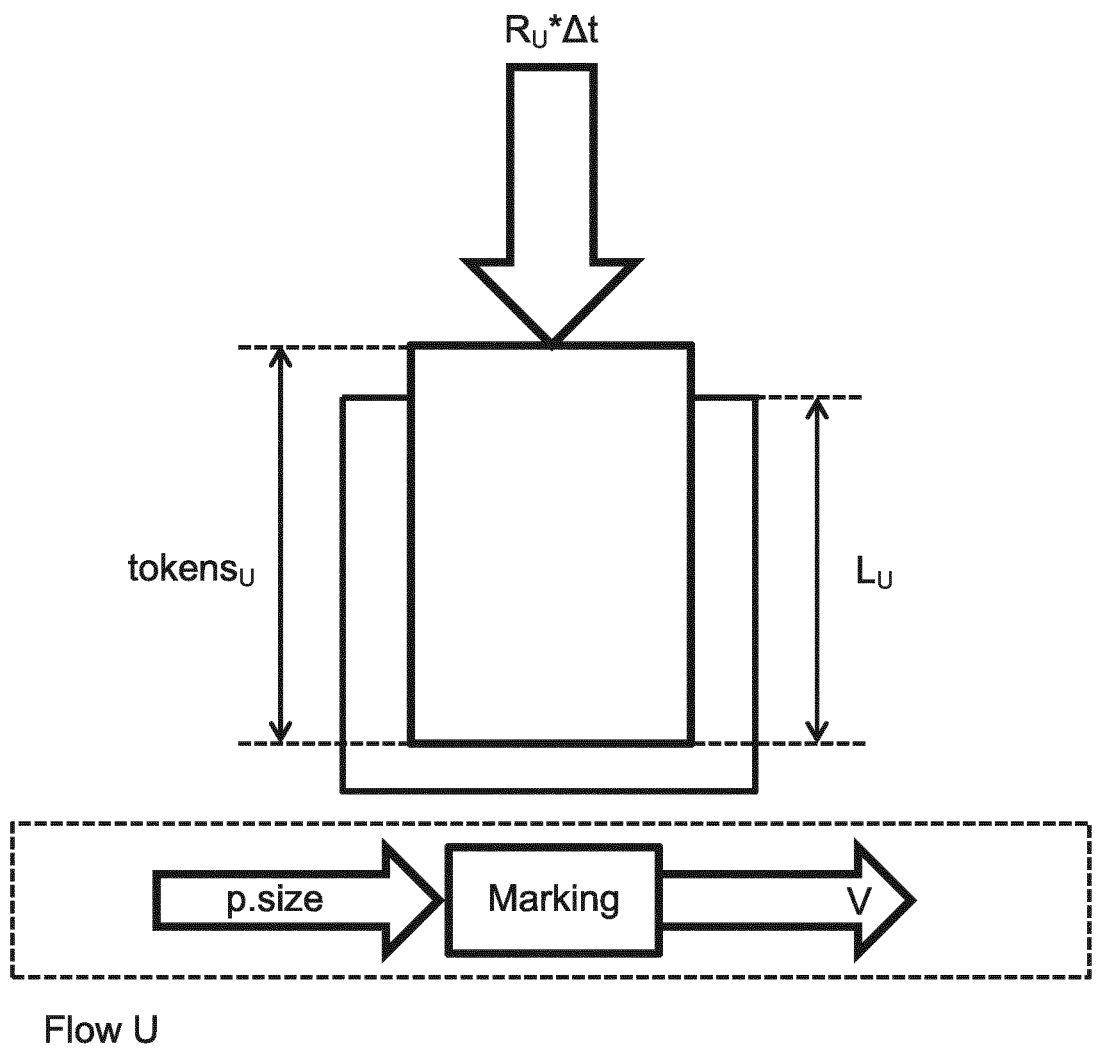
FIG. 5 is a schematic diagram of a token bucket according to an embodiment when the flow rate is overestimated.

FIG. 5 illustrates a token bucket according to an embodiment of the invention when the arrival rate ($R_U$) is overestimated. A packet of flow U with a packet size p.size arrives at the Edge Node (i.e. the marking node). The token level of the bucket is updated by adding $R_U$*$\Delta$t bytes worth of tokens to the bucket, and removing tokens up to a number of bytes equal to p.size. The new token level is greater than the bucket threshold ($L_U$) (i.e. the bucket is overflowing). Hence, the arrival rate is determined to be overestimated. The new rate may be calculated as $R_U$=$R_{U;old}$−(tokens$_U$−$L_U$)/$D_U$. That is, the updated arrival rate is calculated by subtracting from the estimated arrival rate a value determined by the token level, wherein said value determined from the token level is given by subtracting the bucket threshold from the token level, and dividing the difference by a time constant ($D_U$). A random (or pseudo random) number is then generated in the range of 0 to $R_U$, and inputted into the appropriate TVF (corresponding to the operator policy for flow U) to generate the packet value V. The packet value V is included in a header of the packet, which is then forwarded onto the packet network.

Figure 6:
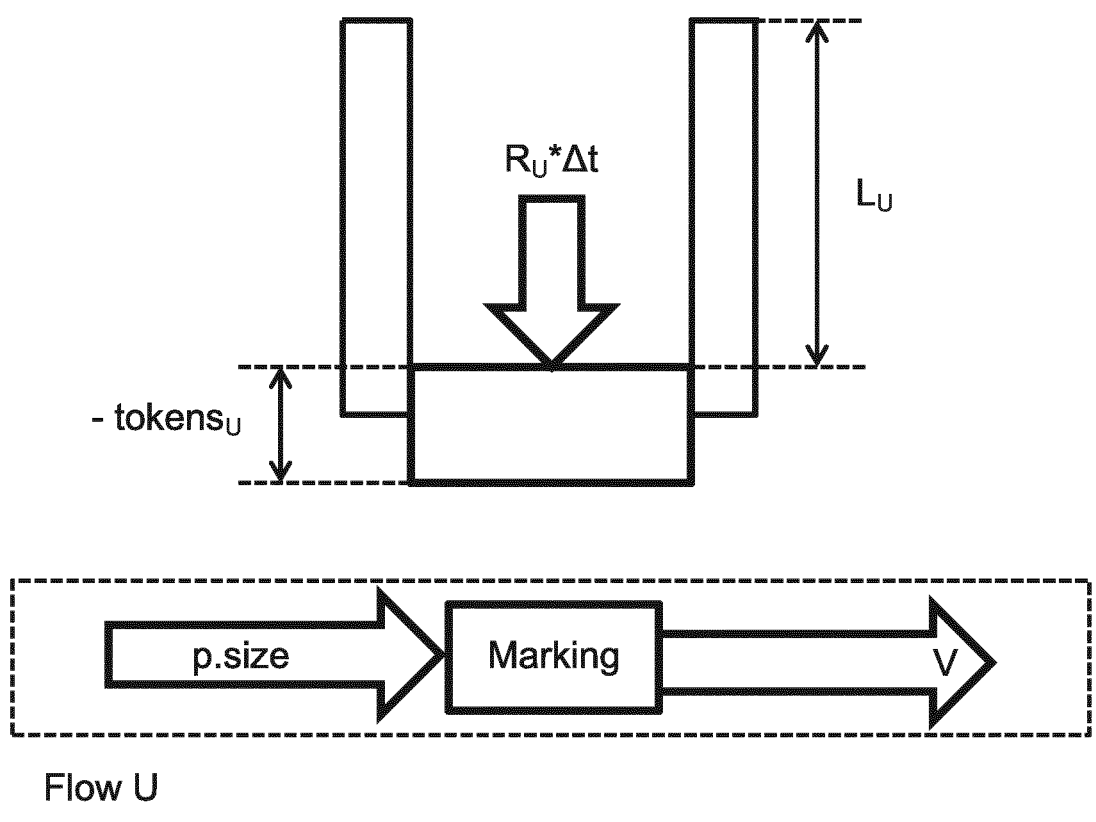
FIG. 6 is a schematic diagram of a token bucket according to an embodiment when the flow rate is underestimated.

FIG. 6 illustrates a token bucket according to an embodiment of the invention when the arrival rate ($R_U$) is underestimated. A packet of flow U with a packet size p.size arrives at the Edge Node (i.e. the marking node). The token level of the bucket is updated by adding $R_U$*$\Delta$t bytes worth of tokens to the bucket, and removing tokens up to a number of bytes equal to p.size. The new token level is less than zero (tokensU<0). Hence, the arrival rate is determined to be underestimated. The new rate may be calculated as $R_U$=$R_{U;old}$+(|tokens$_U$|+$B_U$)/$D_U$, where $B_U$ is a constant number of bytes (e.g. 1500 byte). That is, the updated arrival rate is calculated by adding to the estimated arrival rate a value determined from the token level, wherein said value is calculated by taking the absolute value of the token level, summing it with a byte constant ($B_U$), and dividing the sum by a time constant ($D_U$). A random (or pseudo random) number is then generated in the range of $R_{U;old}$ to $R_U$ (i.e. between the previous and updated arrival rates), and inputted into the appropriate TVF (corresponding to the operator policy for flow U) to generate the packet value V. The packet value V is included in a header of the packet, which is then forwarded onto the packet network.

Figure 7:
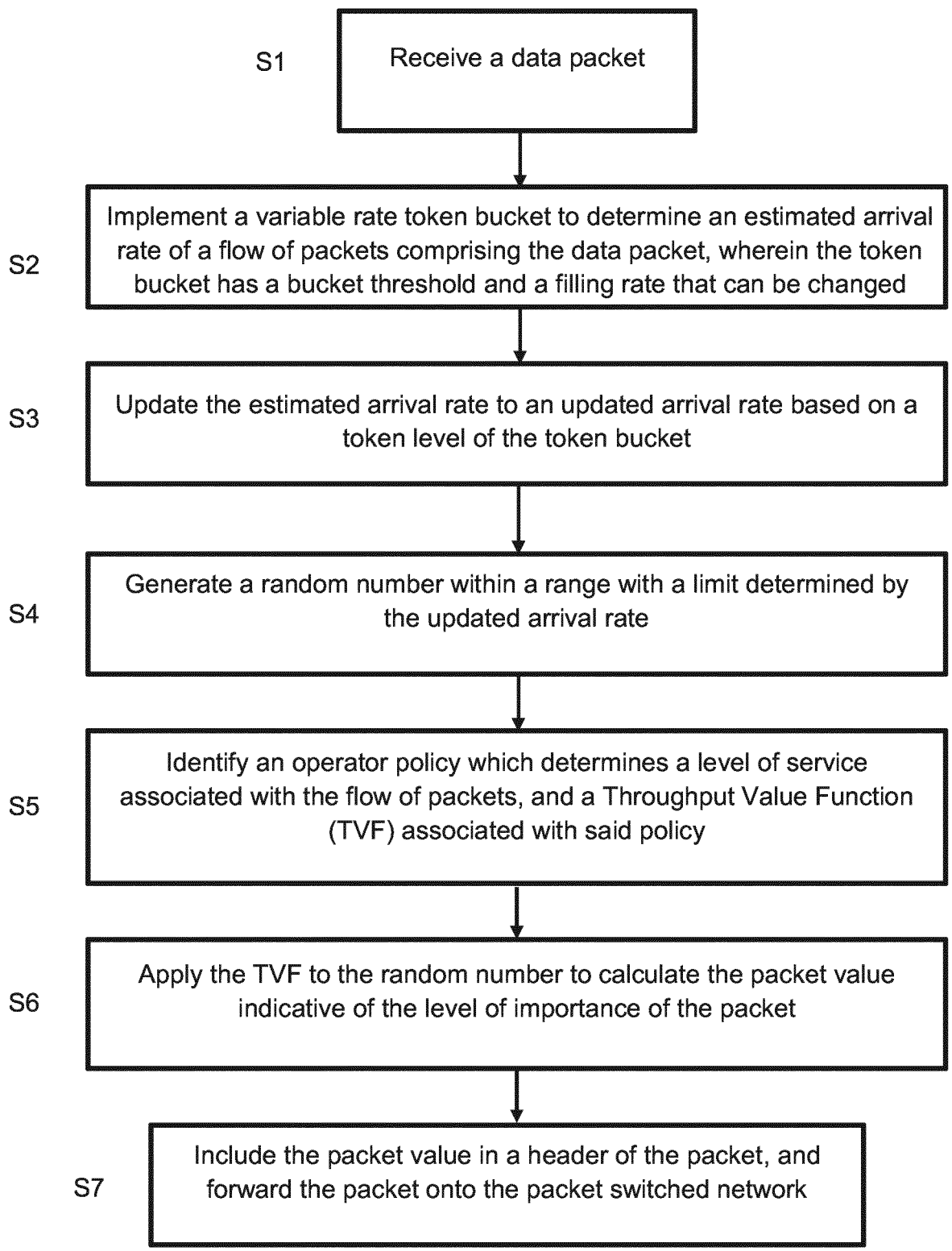
FIG. 7 is a flow diagram showing the steps of a method according to an embodiment.

FIG. 7 is a flow diagram of the steps of a method according to an embodiment. The method comprises receiving a data packet S1; Implementing a variable rate token bucket to determine an estimated arrival rate of a flow of packets comprising the data packet, wherein the token bucket has a bucket threshold and a filling rate that can be changed S2; Updating the estimated arrival rate to an updated arrival rate based on a token level of the token bucket S3; Generating a random number within a range with a limit determined by the updated arrival rate S4; Identifying an operator policy which determines a level of service associated with the flow of packets, and a Throughput Value Function (TVF) associated with said policy S5; Applying the TVF to the random number to calculate the packet value indicative of the level of importance of the packet S6; Including the packet value in a header of the packet, and forwarding the packet onto the packet switched network S7. Although the embodiment illustrated by FIG. 5 provides the steps S1 to S7 in a specific order, in other embodiments the steps may be performed in a different order. For example, the step of identifying the operator policy S5, may be directly after receiving the data packet S1.

Figure 8:
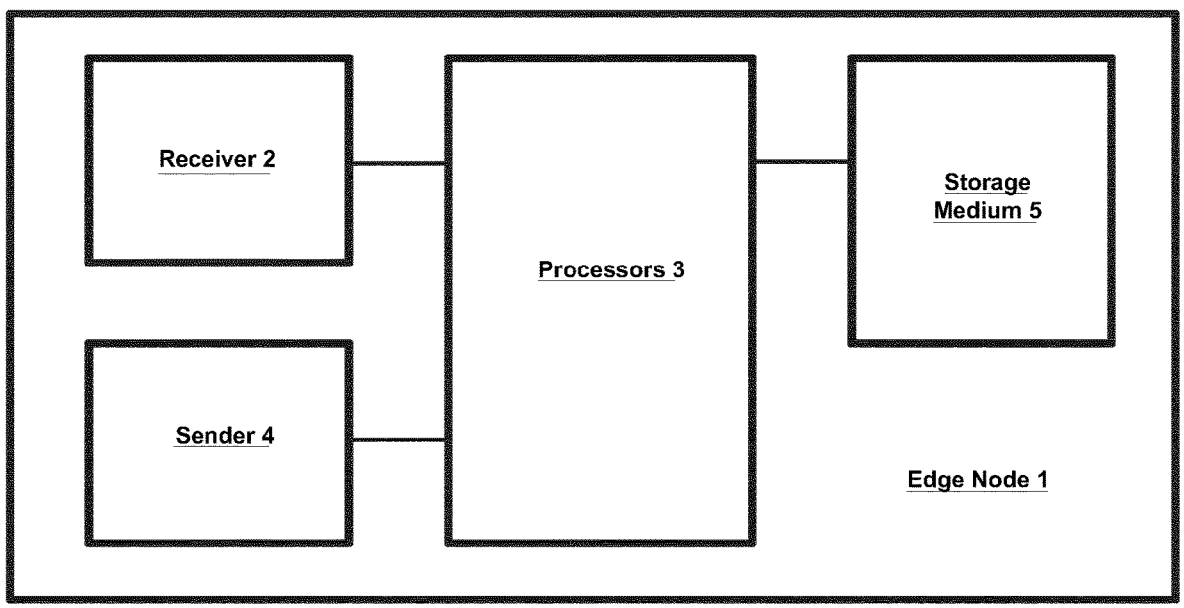
FIG. 8 is a schematic diagram of an Edge Node according to an embodiment.

FIG. 8 is a schematic diagram of an Edge Node 1 according to an embodiment. The Edge Node comprises a receiver 2 for receiving data packets; a processor or processors 3 operative to, for each packet: estimate an arrival rate of a flow of packets comprising the data packet, analyse the arrival rate to determine if that arrival rate is stable, overestimated or underestimated, and update the estimated arrival rate based on the determination, implement a variable rate token bucket to determine an estimated arrival rate of a flow of packets comprising the data packet, wherein the token bucket has a bucket threshold and a filling rate that can be changed, update the estimated arrival rate to an updated arrival rate based on a token level of the token bucket, generate a random or pseudo-random number within a range with a limit determined by the updated arrival rate, identify an operator policy which determines a level of service associated with the flow of packets, and a Throughput Value Function (TVF) associated with said policy, apply the TVF to the random number to calculate the packet value indicative of the importance of the packet, and include the packet value in a header of the packet; and a sender 4 for sending the marked packets onto the packet switched network. The Edge Node also comprises a storage medium 5, which may be a computer readable memory. The storage medium 5 may comprise computer executable instructions, which when executed cause the operator to perform the described methods of handling packets.

The PPV concept can be implemented in the cloud. In order to implement packet marking, a given flow has to traverse the same packet marker, but markers of different flows do not require coordination. The method does not require any knowledge about the flows at the bottleneck, and the bottleneck has the same complexity for a single flow as for millions of flows, which results in very good scaling of the bottleneck.

Embodiments are proposed to be implemented in a single processor/virtual machine in the cloud. Different packet markers can be distributed among processors or virtual machines as they do not require any interaction with other packet markers or with the bottleneck scheduler.

The embodiments described above relate to probabilistic packet marking with fast adaptation mechanisms, where incoming packets, without a previous packet value, are first marked at an Edge Node. However, it is sometimes necessary to remark a packet with a new packet value at the boundary between networks. The following description concerns a hierarchical bandwidth estimation scheme for per packet value (PPV) remarking.

In WO2016/007053 (incorporated herein by reference) the Per Packet Operator Value concept is extended to virtualized environments where remarking of Packet Values at the boundaries of virtual and physical networks are required since the physical network operator can apply various policies to different virtual network operators. If a packet enters the physical network from virtual network VN-1, the remarking algorithm should take into account both the carried Packet Value and the policy defined for VN-1. However, this remarking algorithm is based on a sequential bandwidth estimation scheme which may be unstable. Since the reliability of remarking is based on the accurate reconstruction of the observed throughput-packet value function (TVF), this instability results in deviations from the desired bandwidth share at bottleneck nodes in the physical operator.

It is proposed to solve this problem by using a hierarchical bandwidth estimation scheme to accurately reconstruct the observed throughput-value function (TVF) at the remarker node in the network. Since the Packet Value space could be large, it is split into K disjoint ranges. Instead of estimating the arrival rate for each value range independently, the ranges are organized in a hierarchy with K levels: ith range is part of i+1th range for every i. Then a rate estimation scheme is applied for each level where, for the rate estimation of level i, packets with packet value from ranges i to 1 are taken into account.

The solution may allow the TVF of arrival traffic to be estimated with higher accuracy. Hence, the traffic after remarking will better satisfy the policy of the physical network operator. The hierarchical bandwidth estimation may result in more stable rate estimates and better bandwidth share at bottlenecks in the physical network, satisfying the polices of both physical and virtual operators.

Figure 9:
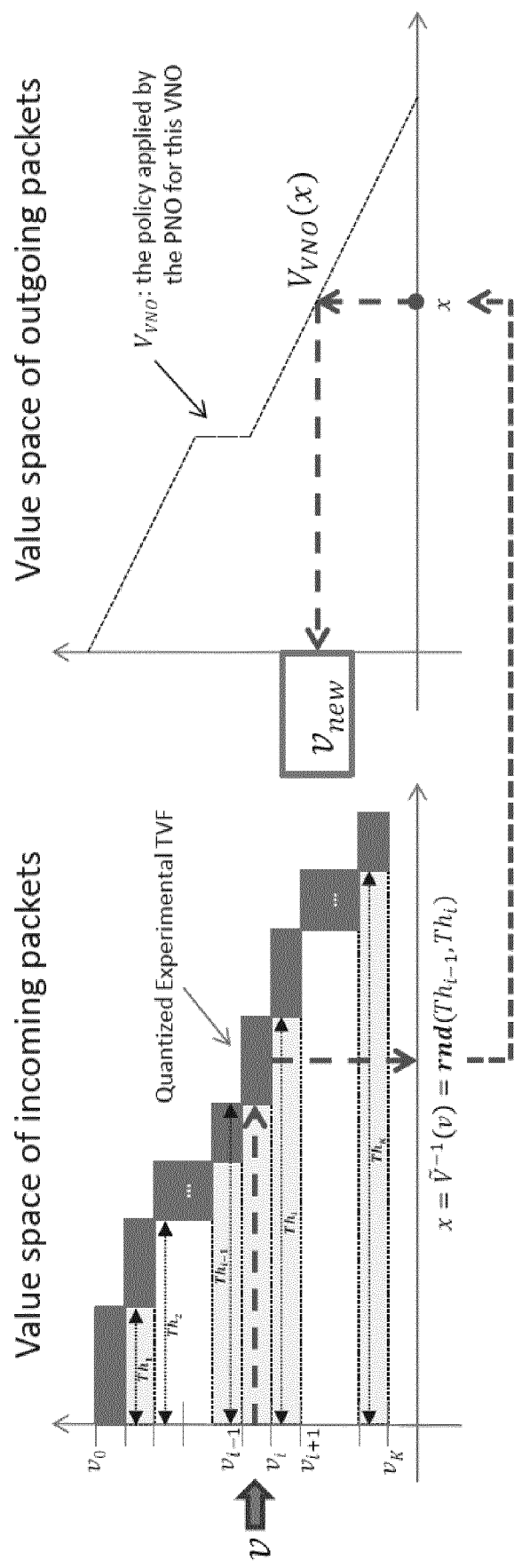
FIG. 9 is a flow diagram depicting a method of remarking packets.

Packet remarking is needed for virtual networking. The incoming traffic is already marked with a Packet Value v and the physical operator has policies for each virtual networks VN defined by a TVF $V_{VN}(.)$. This TVF can be used to calculate the new packet value to be used in the physical network PN. The main steps the proposed method are depicted in FIGS. 9 and 10.

The re-marker node needs to perform the translation between the packet value space of the VN and the PN. To this end, the proposed remarking algorithm first determines the incoming TVF $\tilde{V}(.)$ of the VN's packet value space as depicted on the left side of FIG. 9 and then applies the VN policy of the PN $V_{VN}(.)$, illustrated by the graph on the right of FIG. 9.

Figure 10:
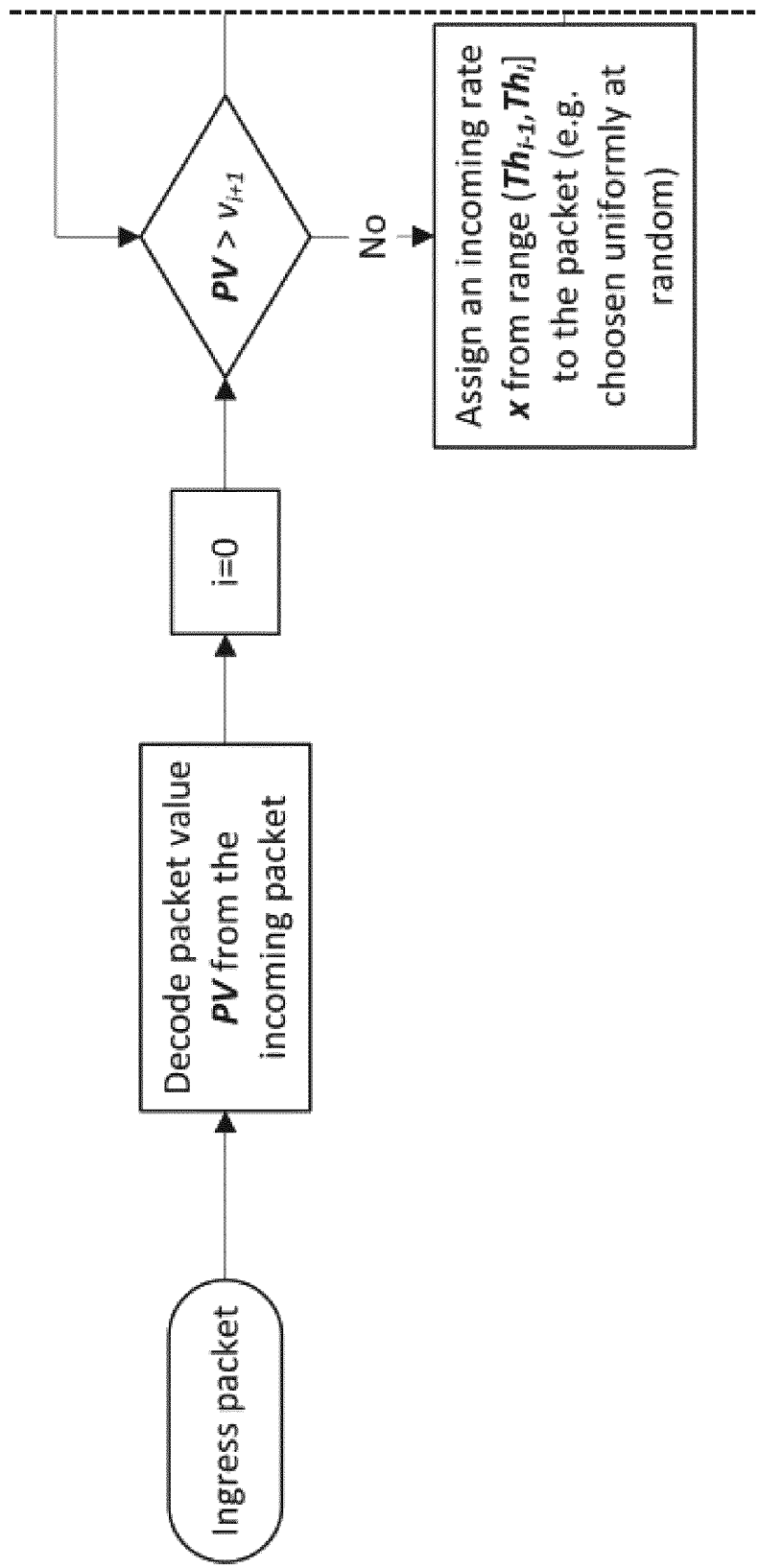
FIG. 10 is a flow diagram showing the steps of a method of remarking packets.
Figure 10:
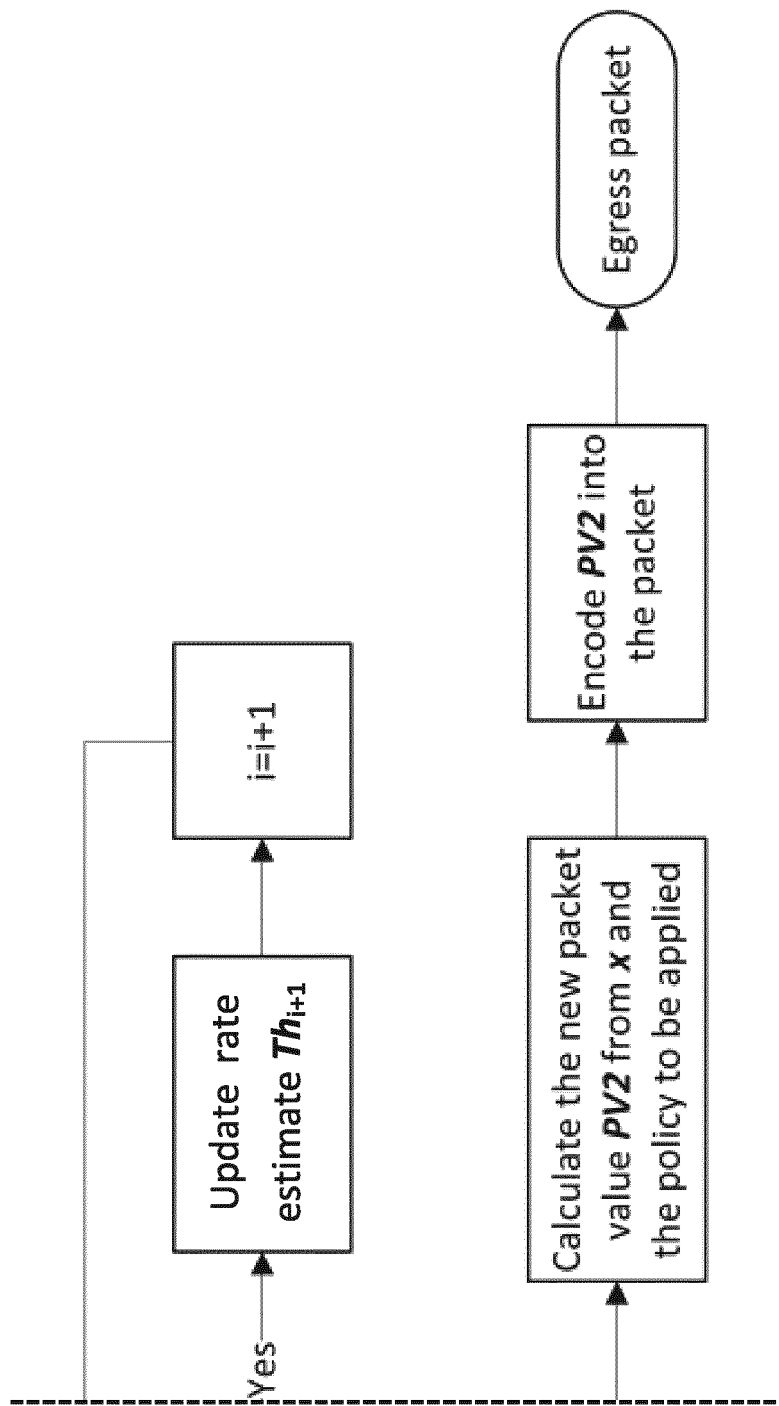

FIG. 10 shows an embodiment of the method split into the following steps:

1) Packet value decoding: After a packet arrives at the remarker node, the carried packet value PV is extracted and decoded from the packet.

2) Construction of incoming TVF: Since the Packet Value space can be large, to reduce the number of states to be stored the proposed algorithm first splits the PV space of the VN into K disjoint ranges: $(v_K, v_{K-1}], (v_{K-1}, v_{K-2}], \ldots, (v_1, v_0]$, where $v_i > v_{i+1}$. The ranges can follow a logarithmic sizing, but they can also be of equal sizes or other schemes are also possible (e.g., if the PN has prior knowledge on the expected PV distribution). For each $v_i$ ($1 \leq i \leq K$), the arrival rate ($Th_i$) of packets with PVs in range $(v_i, v_0]$ are measured, creating an approximation of the incoming TVF illustrated by the gray boxes in the left side of FIG. 9. Practically, for an incoming packet with PV v we first update all the $Th_i$ rate estimates for every i where $v > v_i$ as depicted in FIG. 10.

3) Translation between packet value spaces: Then an incoming rate x is chosen from the range $(Th_{j-1}, Th_j]$ as an approximation of $\tilde{V}^{-1}(v)$ where the packet value of the incoming packet v is in the range $(v_j, v_{j-1}]$. Note that the selection of x can be made e.g. uniformly at random or according to any other schemes. The new packet value can then be calculated by applying the physical operator's policy for the given VN as $v_{new} = V_{VN}(x)$.

4) Packet value encoding: After the new packet value is determined, it is encoded into the packet. The old value may also be encapsulated into the outgoing packet.

In summary, the proposed method of remarking packets involves hierarchically estimating the throughput associated with PV bins, wherein the throughput estimate of a given bin also includes incoming packets with PV higher than the PV in that bin. For an incoming packet, a random throughput value is determined based on the throughput estimate belonging to the PV bin of that packet and on the throughput estimate belonging to the previous PV. The determined throughput value is used in the TVF describing the policy belonging to the VNO.

The invention claimed is:

1. At an Edge Node responsible for forwarding received packets onto a packet switched network, a method of handling the received data packets in order to mark the packets with respective packet values indicative of a level of importance to be used when further handling the packets within the packet switched network, the method comprising:

implementing a variable rate token bucket to determine an estimated arrival rate of a flow of packets, wherein the token bucket has a bucket threshold and a filling rate that can be changed;

receiving a data packet of said flow;

updating the estimated arrival rate to an updated arrival rate based on a token level of the token bucket;

generating a random or pseudo-random number within a range with a limit determined by the updated arrival rate;

identifying an operator policy which determines a level of service associated with the flow of packets, and a Throughput Value Function (TVF) associated with said policy;

applying the TVF to the random number to calculate a packet value indicative of the level of importance of the packet; and including the packet value in a header of the packet and forwarding the packet onto the packet switched network.

2. The method according to claim 1, wherein the step of updating the estimated arrival rate comprises determining if the estimated arrival rate is stable, overestimated or underestimated.

3. The method according to claim 2, wherein the estimated arrival rate is determined to be:

stable if the token level is between zero and the bucket threshold;
overestimated if the token level is greater than the bucket threshold;
underestimated if the token level is less than zero.

4. The method according to claim 2, wherein, when the estimated arrival rate is underestimated, the updated arrival rate is set to a rate that is greater than the estimated arrival rate, and the range within which the random number is generated is set between the estimated and updated arrival rates.

5. The method according to claim 4, wherein the updated arrival rate is calculated by adding to the estimated arrival rate a value determined from the token level.

6. The method according to claim 5, wherein said value determined from the token level is calculated by taking the absolute value of the token level, summing it with a byte constant, and dividing the sum by a time constant.

7. The method according to claim 4, and comprising setting the token level to a constant greater than zero after updating the arrival rate.

8. The method according to claim 2, wherein, when the estimated arrival rate is overestimated, the updated arrival rate is set to a rate that is lower than the estimated arrival rate, and the range within which the random number is generated is set between zero and the updated arrival rate.

9. The method according to claim 8, wherein the updated arrival rate is calculated by subtracting from the estimated arrival rate a value determined by the token level.

10. The method according to claim 9, wherein said value determined from the token level is calculated by subtracting the bucket threshold from the token level, and dividing the difference by a time constant.

11. The method according to claim 10, wherein, if the updated arrival rate is less than the size of the packet divided by the time constant, the updated arrival rate is set to equal the size of the packet divided by the time constant.

12. The method according to claim 11 and comprising setting the token level to zero after updating the arrival rate.

13. The method according to claim 2, wherein, when the estimated arrival rate is stable, the updated arrival rate is set to a rate that is equal to the estimated arrival rate, and the range within which the random number is generated is set between zero and the updated arrival rate.

14. The method according to claim 13, wherein the step of determining the token level comprises:

calculating the token level from at least a previous token level, the estimated arrival rate, a size of the packet, and a time period between the arrival of said packet at the Edge Node and the arrival of an immediately preceding packet of said flow of packets at said Edge Node.

15. The method according to claim 14, wherein the token level is given by the previous token level plus the size of the packet, minus the estimated arrival rate multiplied by said time period.

16. A method of managing packet traffic within a packet network and comprising, at Edge Nodes of the network, handling packets according to claim 1, receiving packets at intermediate nodes of the network, the receiving nodes being configured to maximise the sum of packet values of packets being forwarded.

17. A non-transitory computer readable storage medium for storing computer executable instructions, which when executed cause the computer to perform the method of claim 1.

18. An Edge Node for use in a packet switched network in order to forward packets onto the network and being configured to mark the packets with respective packet values indicative of a level of importance to be used when further handling the packets within the packet switched network, the Edge Node comprising:

a receiver for receiving data packets;
a processor or processors operative to, for each packet
implement a variable rate token bucket to determine an estimated arrival rate of a flow of packets comprising the data packet, wherein the token bucket has a bucket threshold and a filling rate that can be changed;
update the estimated arrival rate to an updated arrival rate based on a token level of the token bucket;
generate a random or pseudo-random number within a range with a limit determined by the updated arrival rate,
identify an operator policy which determines a level of service associated with the flow of packets, and a Throughput Value Function (TVF) associated with said policy,
apply the TVF to the random number to calculate the packet value indicative of the importance of the packet, and
include the packet value in a header of the packet; and
a sender for sending the marked packets onto the packet switched network.

19. The Edge Node according to claim 18, wherein the processor or processors are operative to determine if the estimated arrival rate is stable, overestimated or underestimated.

20. The Edge Node according to claim 19, wherein the processor or processors are operative to determine that the estimated arrival rate is:

stable if the token level is between zero and the bucket threshold;
overestimated if the token level is greater than the bucket threshold; and
underestimated if the token level is less than zero.

21. The Edge Node according to claim 19, wherein, when the estimated arrival rate is underestimated, the processor or processors are operative to set the updated arrival rate to a rate that is greater than the estimated arrival rate, and to generate the random number within the range between the estimated and updated arrival rates.

22. The Edge Node according to claim 21, wherein the processor or processors are operative to calculate the updated arrival rate by adding to the estimated arrival rate a value determined from the token level.

23. The Edge Node according to claim 22, wherein the processor or processors are operative to calculate said value determined from the token level by taking the absolute of the token level, summing it with a byte constant, and dividing the sum by a time constant.

24. The Edge Node according to claim 23, wherein the processor or processors are further operative to set the token level to a constant greater than zero after updating the arrival rate.

25. The Edge Node according to claim 18, wherein the processor or processors are operative to:
- calculate the token level from at least a previous token level, the estimated arrival rate, a size of the packet, and a time period between the arrival of said packet at the Edge Node and the arrival of an immediately preceding packet of said flow of packets at said Edge Node.

26. The Edge Node according to claim 18, wherein said Edge Node is divided over multiple physical or virtual nodes of the packet switched network.

* * * * *